STANLEY A. FIERSTON
HAROLD P. ZITZOW,
            INVENTORS.

STANLEY A. FIERSTON
HAROLD P. ZITZOW,
INVENTORS.

United States Patent Office 3,550,125
Patented Dec. 22, 1970

3,550,125
RANGE ESTIMATOR
Stanley A. Fierston, Kwajalein, Marshall Islands, and Harold P. Zitzow, Reading, Mass., assignors, by mesne assignments, to the United States of America as represented by the Secretary of the Army
Filed Oct. 25, 1968, Ser. No. 770,693
Int. Cl. G01s 9/06; G04f 11/08
U.S. Cl. 343—13                                8 Claims

ABSTRACT OF THE DISCLOSURE

A range estimator capable of processing a variety of input pulse widths and measuring single or extended target range. A delay line is tapped at various intervals to tap the particular pulse width desired. A relay or electronic switch is used to switch the proper taps to a differential amplifier. In operation, an input pulse is fed to the delay line and tapped at several points along the line. The tapped signals are summed in two groups and connected to the differential amplifier. The amplifier output is connected to a zero crossing detector which produces a pulse whenever the amplifier output changes polarity. This zero crossing detector output is connected to a range register which indicates the range time of the single or extended return.

BACKGROUND OF THE INVENTION

In a multifunctional array radar (MAR), the primary function of a range estimator is to generate an accurate measurement of range time for a selected single target return. MAR requirements necessitate the recognition of extended targets and the measurements of their extent, as well as single target returns. The radar echo received from two or more targets separated by less than the range resolution interval is longer than the transmitted pulse. Extent for an extended target is taken to mean the number of successive coarse range intervals (range resolution intervals) in which a target or target group provides a return signal that continuously exceeds some threshold. Extent, then is a measure of the duration of the echo in terms of the range interval. A single target, using this extent definition, will have an extent of one.

Since a large number of range estimators are required for MAR, it is desirable to keep the complexity of a single estimator to a minimum. For maximum utility, a single estimator must also be capable of processing both single and extended returns.

SUMMARY OF THE INVENTION

The apparatus of the present invention is a range estimator, including a detector which forces an extended target to appear as two single targets separated by a number of range resolution intervals from the detector. The initial appearance of an extended signal can then be employed to estimate the range of the closest target. The second appearance of an extended pulse, at its trailing edge, then signifies its extent, that is, the number of range intervals of separation between the first and second signal. For an extended pulse the estimated range will signify the near range portion of an extended target. For a single pulse return, the estimated range will be actual range. The trailing edge of a single pulse will provide an extent state of ONE. The trailing edge of an extended pulse will provide an extent state of more than ONE, the state depending on the minimum range interval.

A range estimator may be composed of two distinct units, a range detector and a range register. A range detector may comprise a set of delay lines, linear summing circuits, and unity gain inverters. A more simplified detector may comprse a single delay line and a differential amplifier. The more simplified detector reduces the complexity of the device while performing the same function. A range register comprises a threshold detector, gate circuits, timing clocks and counter circuits for determining range estimates and range extent.

DESCRIPTION OF THE PREFERRED EMBODIMENT

Figure 1:
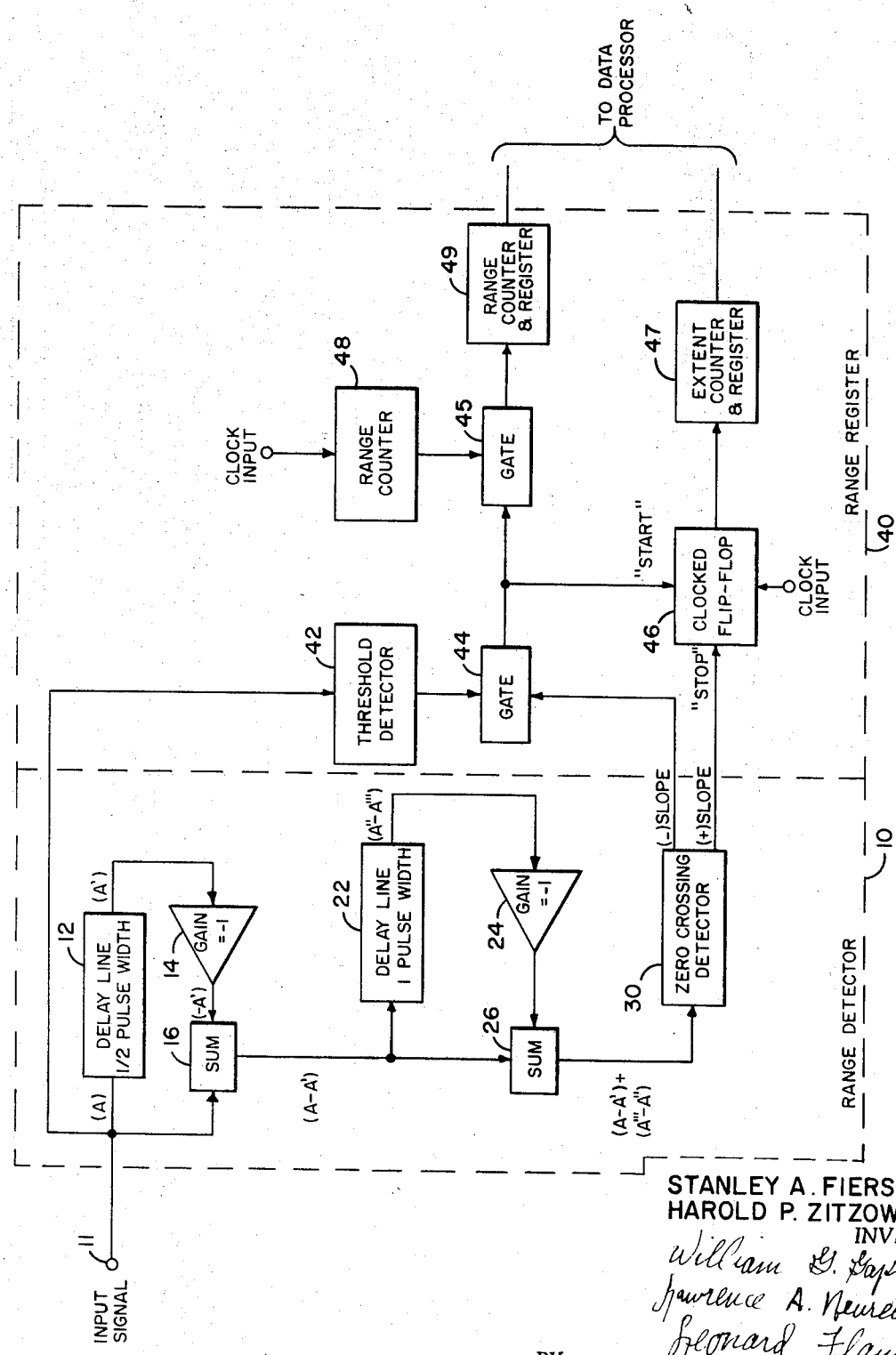
FIG. 1 is a block diagram of a range estimator.

Throughout the several figures, like numbers will correspond to like parts. In FIG. 1 a range estimator is shown that is composed of two distinct units—a range detector 10 and a range register 40. Range detector 10 includes a pair of delay lines 12 and 22, each of which has an output connected through an inverter to a summing circuit. An input signal, returning from a target, is connected to delay line 12, to a summing circuit 16, and to a threshold detector 42 in the range register 40. Delay line 12 is connected to a unity gain inverter 14 and inverter 14 has an output connected to linear summing circuit 16. The output of summing circuit 16 is connected to an input of delay line 22 and to an additional linear summing circuit 26. The output of delay line 22 is connected to the input of a unity gain inverter 24 which has an output connected to summing circuit 26. An output of summing circuit 26 provides an input signal to a zero crossing detector 30, which produces an output pulse when the input signal changes polarity. When an input signal to the detector 30 crosses the zero reference with a negative slope, going from positive to negative, a first output is produced and is connected to a gate 44. When an input signal crosses the zero reference with a positive slope, going from negative to positive, a second output is produced and is connected to gate 46. These two output signals connected to gate circuits 44 and 46 within the range register 40 are for determining the range estimate and range extent.

Zero crossing detector 30 may be a conventional comparator circuit using a two-stage over driven difference amplifier. Detector 30 can also be similar to that shown by W. L. Kitchens et al. in Pat. No. 3,223,851 although it need not be as elaborate a circuit.

Range register 40 includes threshold detector 42 having an output connected to gate 44. Gate 44 has an output connected to a gate 45 and to the start or set conrol of gate 46. Gate 46 may be a clocked flip-flop having an output connected to an extent counter and register 47. Gate 45 has an input from a clocked range counter 48 and an output to a range counter and register 49. The output circuits of the range and extent registers are connected to a digital data processor or other data processing machine (not shown) for ultimate evaluation of the received radar echo.

Operation of the range estimator may best be understood by following an input signal therethrough. Let an input signal or atrget echo be denoted as A. Signal A will be way of an input terminal 11 directly to summing network 16 and delay line 12. Delay line 12 will delay the signal by one-half of its width, which is denoted by A'.

Figure 4:
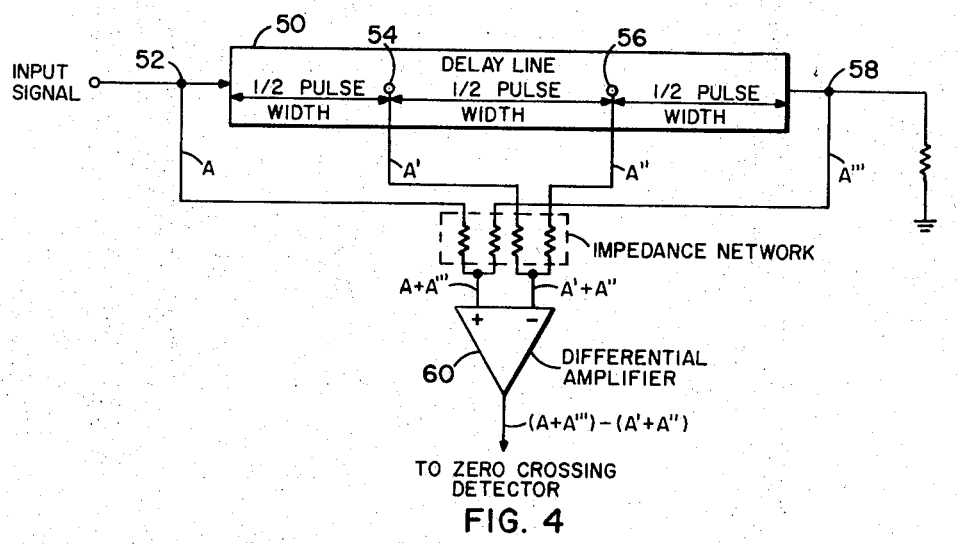
FIG. 4 is a simplified range detector.

The signal A′ is passed through the inverter 14 to summing network 16. The summed signal (A—A′) is then fed through the same type of circuitry that the original signal A was fed through. The only difference being that delay line 22 delays the signal by one full pulse width denoted by a double prime added to each signal fed therethrough (A″—A‴). The resultant two signals applied to summing network 26 are (A—A′) at one input and (A‴—A″) at a second input. The ultimate result at the output of summing circuit 26 can be expressed as $(A+A‴)—(A′+A″)$. Since this function represents the work performed on signal A, it can also be performed as shown in FIG. 4, which will be discussed later. The output from summing circuit 26 is then fed to the zero crossing detector 30. Output pulses from detector 30 are connected to gate circuits 44 and 46.

The original signal A is applied to threshold detector 42 in the range register at the same time that it is applied to delay line 12. Threshold detector 42 supplies a pulse to gate 44 when the detected input signal is sufficient to overcome the threshold bias. When a zero crossing having a negative slope is reached in crossing detector 30, a signal pulse is applied to gate 44. Gate 44, having already been placed in a state of readiness by threshold detector 42, triggers and passes a start pulse to gates 45 and 46. Gate 45 has been previously primed by a clocked range counter 48 that is activiated at the transmitter main bang and now triggers to provide a range estimate to range counter 49. Gate 46 is activated by the start signal from gate 45 and activates extent counter 47. When a positive going signal crosses zero in detector 30, a stop signal is applied to gate 46. Gate 46 deactivates extent counter 47 thereby determining the range extent.

Figure 2:
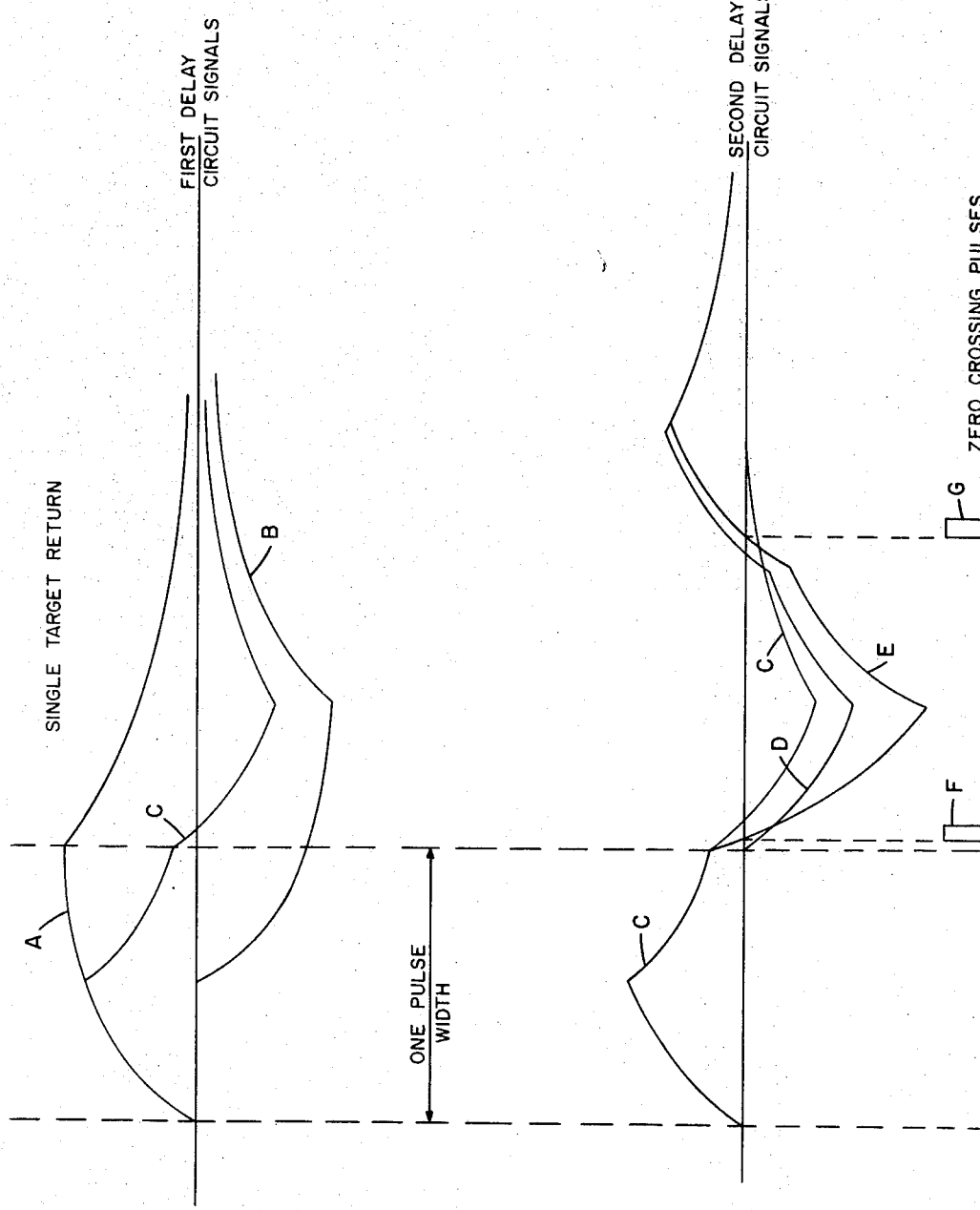
FIG. 2 discloses the pulse shape developed in the range detector for a single target return.
Figure 3:
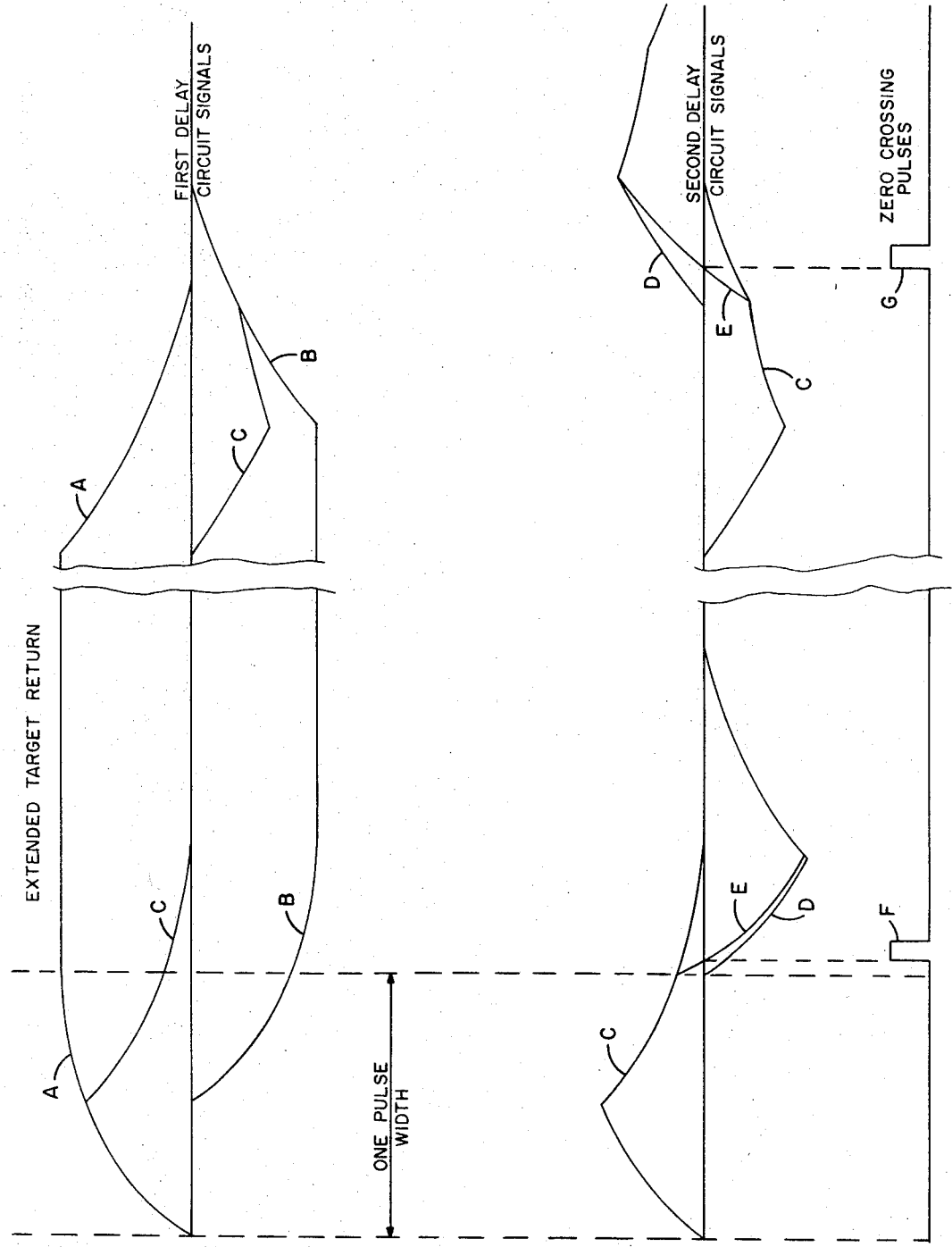
FIG. 3 discloses the pulse shape developed in the range detector for an extended target return.

FIGS. 2 and 3 illustrate ideal signal waveforms at various locations within the range detector. FIG. 2 illustrates the single pulse case where the target is at relatively close range. FIG. 3 illustrates an extended range pulse. In both figures, the following signals are illustrated.

Signal: Description
- A____ Ideal input signal (A).
- B____ Input signal delayed one-half pulse width and inverted (—A′).
- C____ Linear summation of signals A and B.
- D____ Signal C delayed one pulse width and inverted.
- E____ Linear summation of signals C and D.
- F____ Pulse indicating a positive to negative zero crossing.
- G____ Pulse indicating a negative to positive zero crossing.

Signals F and G ultimately control range time sampling and the extent measurement.

While only ideal signals are considered in FIGS. 2 and 3, the use of a double delay summation technique provides a certain degree of protection against noise perturbations. The method depends more upon the initial slope of the input signal than upon its absolute ampltiude. Thus, to a considerable extent, leading edge range estimates remain quite accurate under noise conditions. The steep slopes of waveform E in crossing the zero axis indicates this fact, its zero crossing changing little with a noisy signal.

A simplified range detector, that will provide the same function as the detector using two delay line sets, is disclosed in FIG. 4. A single delay line 50 is tapped at intervals wherein each tap—52, 54, 56 and 58—is spaced at intervals equivalent to one-half the input pulse width. This will provide signals at terminal 52 that are undelayed, at terminal 54 that are delayed by one-half of the pulse width (A′), at terminal 56 that are delayed one pulse width (A″), and at terminal 58 that are delayed one and one-half pulse width (A‴). The required sets of signals, $(A+A‴)$ and $(A′+A″)$, are each summed at one of two inputs to a differential amplifier 60. After passing through an impedance network the two separate sums are formed, with the difference amplifier performing the required subtraction. Two inverting amplifiers, two summing circuits and two delay lines can, therefore, be replaced by a single delay line and a differential amplifier. The differential amplifier 60 has its output connected to the zero crossing detector 30 (not shown).

Figure 5:
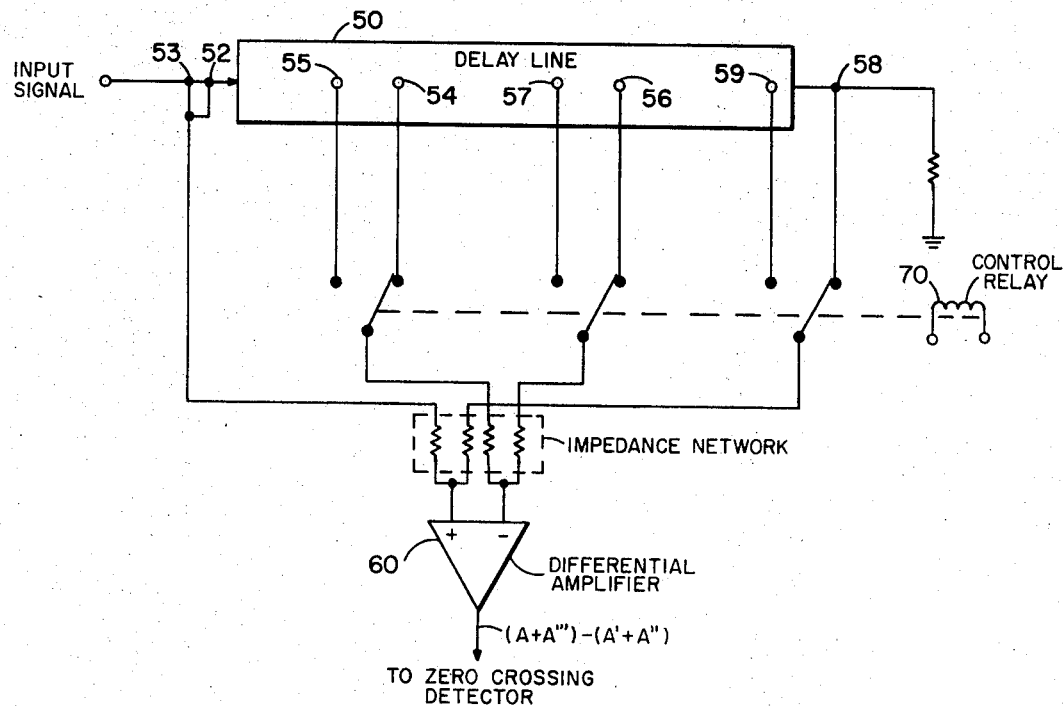
FIG. 5 is a simplified range detector capable of processing a variety of input pulse widths.

The additional requirement of having to process a variety of input pulse widths would call for another range detector for each different pulse width in the range detector as disclosed in FIG. 1. The simplified range detector, however, can process other pulse widths by merely adding more taps to the delay line and a relay to switch the proper taps to the amplifier. FIG. 5 illustrates this capability for a two pulse width case. A delay line 50 has taps 52, 54, 56 and 58 spaced at intervals equivalent to one-half the first input pulse width. These taps are connected through the contacts of a relay 70 to appropriate terminals of differential amplifier 60. The circuit as shown performs exactly as does the circuit disclosed in FIG. 4. However, prior to receipt of a different input pulse width, control relay 70 activates to connect a second group of taps to the inputs of amplifier 60, while simultaneously disconnecting the first group of taps. The second group of taps—53, 55, 57 and 59—are spaced at intervals equal to one-half of the input pulse width of this other pulse. As in the first case, the required sets of signals received and summed at the inputs of amplifier 60 may be represented by the symbols $(A+A‴)$ and $(A′+A″)$. Obviously, different symbols may be used to represent the summed outputs from the delay line. This is only logical when more than one input signal is processed, different characters or symbols being indicative of different input signals. Also, taps 52 and 53 may coincide if they are located, as shown, where an input pulse will be tapped prior to delaying action of either signal. This eliminates the need of one set of relay or switching contacts.

In processing a variety of input pulses, electronic switches can be employed in the place of relay contacts if speed of changeover is of concern. Stepping switches and other similar devices may also be considered in an intermediate stage of transferring the desired signal from the delay line to the differential amplifier.

The described range estimator includes a range detector offering the advantage of minimal equipment for a variety of input pulse widths. Other advantages includes the ability to detect and measure extended targets, and a range time estimate offering a small bias error.

Although particular embodiments and form of this invention have been illustrated, it is obvious to those skilled in the art that modifications may be made without departing from the scope and spirit of the foregoing disclosure. Therefore, it is understood that the invention is limited only by the claims appended hereto.

We claim:

1. A range estimator comprising: a signal input terminal; means connected to said input terminal for receiving and passing only signals having a predetermined magnitude; delay means connected to said input terminal for delaying an input signal; combining means having at least an output and first and second inputs, having the inputs thereof connected respectively to said input terminal and said delay means for combining an input signal with a delayed input signal; a first trigger circuit having an output and first and second inputs, said first input being connected to said receiving means and operably responsive to the output thereof to be placed in a ready state; reference means having an input and first and second outputs, said input being connected to an output of said combining means, said first output being connected to the second input of said first trigger for activation thereof; a range estimate indicator circuit connected to the output of said first trigger circuit; a second trigger circuit having first, second and third inputs and an output, said first input being connected to the second output of said reference means, said second input being connected to the output of said first trigger circuit; a clocked input connected to the third input of said second trigger circuit; and a range extent counter and indicator connected to the output of said second trigger circuit.

2. A range estimator as set forth in claim 1 wherein said range estimate indicator includes a clocked range counter circuit having an output; a gate circuit having an output and first and second inputs, said first input being connected to the output of said counter, and said second input being connected to the output of said first trigger circuit; and an indicator having an input connected to the output of said gate circuit for indicating the range as determined by said counter when said gate is activated.

3. A range estimator as set forth in claim 2 wherein said receiving and passing means is a threshold detector, and said reference means is a zero crossing detector that produces an output signal when the input signal is zero or crosses zero.

4. A range estimator as set forth in claim 3, wherein said delay means comprises first and second delay lines each having an input, an output, and a unity gain inverter; said inverter having an input and an output, having the input thereof connected to the respective delay line outputs; said combining means comprises first and second summing circuits, each having first and second inputs and an output, the first input of said first summing circuit being connected to the output inverter of said first delay line, the first input of said second summing circuit being connected to the output inverter of said second delay line, the second input of said first summing circuit being connected to the input of said first delay line, the output of said first summing circuit being connected to the input of said second delay line and to the second input of said second summing circuit, the output of said second summing circuit being connected to the input of said zero crossing detector.

5. A range estimator as set forth in claim 3 wherein said delay means is a delay line having taps therein at intervals equivalent to one-half of an input pulse width; said combining means is a differential amplifier having first and second inputs and an output, said inputs being connected to said taps on the delay line, and said output being connected to the input of said zero crossing detector.

6. A range estimator as set forth in claim 3 wherein said delay means is a delay line having first, second, third and fourth taps at intervals such that the fourth tap is separated from the first tap by a distance equal to one and one-half the width of an input pulse, said second and third taps are between said first and fourth taps with each tap separated from an adjacent tap by a distance equal to one-half the width of an input pulse; and said combining means is a differential amplifier having first and second inputs and an output, said first input being connected to said first and fourth taps of the delay line, said second input being connected to said second and third taps of the delay line, and said output being connected to the input of said zero crossing detector.

7. A range estimator as set forth in claim 3 wherein said delay means is a delay line having a plurality of taps therein arranged in groups; each group having first, second, third and fourth taps, each of said taps being spaced apart from adjacent taps within a group by a distance equal to one-half an input pulse width thereby separating said fourth tap from said first tap by one and one-half pulse width; and said combining means comprises a differential amplifier having first and second inputs and an output, and a switching network connected to the inputs of said differential amplifier for sequentially or specifically connecting a group of said taps to said amplifier inputs; and said first input of the differential amplifier being connected through said switching network to said first, and fourth taps of a selected delay line tap group, said second input of the amplifier being connected through said switching network to said second and third taps of the selected delay line tap group, and said differential amplifier output being connected to the input of said zero crossing detector.

8. A range estimator as set forth in claim 7 wherein said delay line tap groups each have the first of said taps as a common tap located at the beginning of said delay line for tapping any input pulse at said first tap before delaying action begins.

References Cited
UNITED STATES PATENTS 3,162,852  12/1964  Altovsky et al. _____ 343—17.1
3,181,145   4/1965  Towle et al. ___ 343—5(DP)UX RODNEY D. BENNETT, Primary Examiner T. H. TUBBESING, Assistant Examiner U.S. Cl. X.R.

324—68; 343—17.1